2,927,905
Patented Mar. 8, 1960

2,927,905
METHOD OF MAKING EXPANDED POLYURETHANE POLYMER

Charles F. Eckert, Westwood, N.J., assignor to United States Rubber Company, New York, N.Y., a corporation of New Jersey No Drawing. Application December 31, 1957
Serial No. 706,264

8 Claims. (Cl. 260—2.5)

This invention relates to a method of making an expanded, cured elastomeric polyurethane polymer (by which is meant an elastomeric, cross-linked, polyether or polyester modified by reaction with an organic diisocyanate) and more particularly to a method of making low-density sponge of said elastomeric polymer.

This application is a continuation-in-part of my application Serial No. 464,905, filed October 26, 1954, and now abandoned.

Elastomeric, synthetic polyurethane polymers have recently become important as new rubbery materials. Such conventional polymers are described in detail in an article by O. Bayer et al. which appeared in Rubber Chemistry and Technology, volume 23, pages 812–835 (1950), and elsewhere in the patent and technical literature. As is now well-known, the elastomeric synthetic polyurethanes are capable when cured of being extended to more than 200% and of returning rapidly to approximately their original length, and are made in conventional practice from three reactants, viz.: (1) a linear polyether or polyester, (2) an organic polyisocyanate, and (3) an initiator of cross-linking. In such conventional practice (and in the present invention), the linear polyethers or polyesters employed contain terminal alcoholic hydroxyl groups.

While the preparation of the polyesters or polyethers suitable for reacting with diisocyanates to form elastomers forms no part of the present invention per se, and is amply described in the literature and prior patents, it may be mentioned here by way of illustration that a preferred polyester is a linear polymeric polyester (i.e., an alkyd) prepared from a glycol material (for example, from a mixture of ethylene glycol and propylene glycol) and an aliphatic saturated dicarboxylic acid (for example, adipic acid), an excess of glycol over acid being used, so that the resulting polyester chains are terminated predominantly by alcoholic hydroxyl groups. Usually such an amount of glycol is used as to give a polyester having a hydroxyl number of 20 to 120, preferably of 36 to 67, and a low acid value, less than 2 and preferably less than 1. The molecular weight of the polyester preferably ranges from 1700 to 3000. Sometimes it is advantageous to include a small amount of a trifunctional alcohol in the preparation, although the resulting polyester is still essentially a linear product. This polyester is then reacted with an organic diisocyanate, a considerable excess of the diisocyanate being used, commonly from 20% to 250%, preferably from 50% to 100%, more diisocyanate than would be required to react with all of the alcoholic hydroxyl groups of the polyester. The reaction is effected by heating a mixture of the polyester and the diisocyanate under anhydrous conditions at an elevated temperature, e.g., 70–150° C., to form a soluble, uncured, liquid material which is a linear polyurethane having unreacted terminal isocyanate groups.

Regarding the polyethers used in preparing polyurethane elastomers, this feature of the invention is also conventional, and requires no detailed elaboration here. It may be mentioned that preferred materials are the conventional polyalkylene polyethers with terminal hydroxyl groups. Many such compounds may be represented by the formula $HO(RO)_nH$, in which R is typically a divalent alkylene radical, and $n$ is an integer such that the average molecular weight of the material (which due to its method of manufacture usually comprises a mixture of molecules of different sizes) lies between 900 and 6000. As is well known, compounds of this type may be made by the polymerization of an alkylene epoxy compound, such as ethylene oxide or 1,2-propylene oxide (or of a mixture of such epoxy compounds) in the presence of an initiating bifunctional compound HR'H containing two hydrogen atoms reactive with the epoxy compound. Examples of such initiating compounds are dialcohols $H(OR_1O)H$, such as ethylene glycol 1,6-hexanediol etc., and diprimary aliphatic amines, such as ethylene diamine, 1,6-hexane diamine, etc.; other types of initiating compounds are well known to those skilled in the art. This invention is not restricted to polyalkylene polyethers made by any particular method. While typical commercial materials have substantially the formula shown, it will be understood that in practice the polymer chain also contains units other than the linkage —ORO—, due to the initiating compound.

In general it may be stated that both the preferred polyesters and preferred polyethers have in common the feature of having alcoholic hydroxyl terminal groups (by which I of course mean that the material has substantially exclusively alcoholic hydroxyl terminal groups) in their molecules, and they have an average molecular weight of from 900 to 6000 (preferably 1500 to 3000). The hydroxyl number is defined as the weight in milligrams of potassium hydroxide equivalent to the alcoholic hydroxyl content of one gram of material. Thus for the dihydroxy polyesters and polyethers, the following relationship exists between hydroxyl number and molecular weight (neglecting any residual acid groups in the polyesters):

$$\text{Molecular weight} = \frac{112,000}{\text{hydroxyl number}}$$

The following figures show typical values for molecular weight and hydroxyl number:

| Molecular Weight | 900 | 1,500 | 3,000 | 6,000 |
|---|---|---|---|---|
| Hydroxyl No. | 125 | 75 | 37 | 19 |

The diisocyanate used in preparing the polyurethane materials used in the invention may of course be any diisocyanate conventionally used for this purpose, as illustrated, for example, in the publication above referred to, or in U.S. Patent No. 2,814,834 of Hess et al., December 3, 1957. Typical diisocyanates that are conventionally employed (as represented by the formula

OCN—R—NCO where R is a divalent hydrocarbon radical) are the polymethylene diisocyanates such as 1,2-ethane diisocyanates, tetramethylene diisocyanate and hexamethylene diisocyanate; other alkane diisocyanates such as propane 1,2-diisocyanate, cycloalkane diisocyanates such as cyclohexane 1,4-diisocyanate; and aromatic diisocyanates such as m- and p-diisocyanatobenzenes, tolylene diisocyanates, p,p'-diphenylene diisocyanate, and 1,5-naphthalene diisocyanate, as well as aliphatic-aromatic diisocyanates such as p,p'-diphenylmethane diisocyanate, phenylethane alpha, beta-diisocyanate

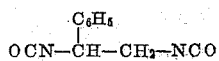

3,3'-bitolylene-4,4'-diisocyanate and

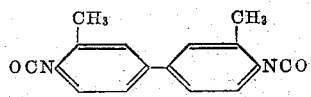

Limited amounts of triisocyanates may be used.

It would be understood that more than one polyester (or a polyester made from more than one glycol or more than one acid) and/or more than one polyether (which may in turn be mixed polyethers), as well as more than one polyisocyanate, can be used in practicing the invention. Frequently the molecular proportion of diisocyanate to polyester or polyether ranges from 1.2 to 1 to 5 to 1 (preferably 1.5 to 1 to 3 to 1).

The problem of making cured elastomeric sponge of low density from a liquid adduct of polyester or polyether and diisocyanate of the type described above has arisen. As is known to those skilled in the art, the admixture of a small amount of water with such a polyurethane intermediate causes the formation of carbon dioxide which in turn causes the material to expand. When the evolution of carbon dioxide is complete, the reaction product has been converted to a semi-rigid, spongy state and can be cured with heat. The cured sponge has a density of 0.3 gram/cc. or more and is hard.

In attempting to make sponge of a lower density, I have added a variety of blowing agents to the liquid diisocyanate:polyester or polyether adduct. Among the blowing agents which I have tried are the following: hydrogen peroxide, ammonium carbonate, diazoaminobenzene, and sodium bicarbonate. All of these chemicals were unsatisfactory for one reason or another. Thus, for example, thermal decomposition of sodium bicarbonate in the liquid intermediate caused some expansion, but most of the carbon dioxide evolved was lost, probably because of the low viscosity of the intermediate at the decomposition temperature (130° C.) of the sodium bicarbonate. Attempts to decompose the sodium bicarbonate with acid were unsuccessful because the acid inhibited the cure although the expansion was adequate. The other blowing agents mentioned were unsatisfactory because they reacted with the intermediate and prevented it from curing properly.

I have unexpectedly found that a solution of an alkali metal nitrite in water is an excellent blowing agent for liquid polyester or polyether-and-diisocyanate reaction products of the type described above.

In practicing my invention I can use any alkali metal nitrite. However, economic considerations make only potassium and sodium nitrite commercially feasible for use in my invention.

In practicing my invention I generally employ from 1 to 5 parts of the alkali metal nitrite, per 100 parts of the liquid diisocyanate:polyester or polyether adduct.

The amount of water should be sufficient to dissolve the alkali metal nitrite and will generally range from 1 to 5% of the weight of the adduct. The concentration of the aqueous solution of the alkali metal nitrite will usually be equal to from 30 to 60 parts of the nitrite per 100 parts of solution. I find it very convenient to use a 50% solution, made by dissolving the nitrite in an equal weight of water.

Generally speaking, in the practice of my invention I intimately incorporate the aqueous solution of the nitrite with the liquid adduct, expand the resulting mixture, and thereafter heat the expanded mixture at an elevated temperature to complete curing of the spongy elastomeric polyurethane polymer formed by the reaction. The water serves as initiator of both the cross-linking and the expansion reactions which finally result in the formation of a material resembling vulcanized natural rubber sponge. The water is thus an essential element in my invention.

In applying my invention to a liquid diisocyanate:polyester or polyether adduct, I find it convenient to heat the liquid adduct to render it sufficiently fluid to enable uniform dispersion of the aqueous solution of the nitrite therethrough without difficulty. It will be understood that the reaction product has an extremely high viscosity at room temperature, its consistency resembling that of heavy molasses, and that its viscosity decreases with heating. As soon as the aqueous alkali metal nitrite solution has been dispersed in the liquid reaction product the mass commences to expand. The temperature of the mass will usually range from 40° C. to 80° C. The expansion continues upon standing until the blowing reaction ceases. When the expansion stops, a yellow, sponge-like product is obtained. This sponge-like product is then cured by heating it at a suitably elevated temperature, typically 100–170° C., for a suitable period of time, typically from 10 minutes to 2 hours, to complete the curing reaction. It will be understood that the water reacts with a portion of the unreacted isocyanate groups in the reaction product, converting them to amino groups which are highly reactive with other isocyanate groups forming urea groups which in turn are reactive with remaining isocyanate groups, giving a highly cross-linked product.

In practicing my invention, I find it very advantageous to include in the mixture of reactants a small amount of a dispersing agent, e.g., oleic acid, to facilitate dispersion of the aqueous alkali metal nitrite solution in the organic reaction product. The amount of such dispersing agent will usually be from 1 to 10 parts per 100 parts of elastomeric polyurethane polymer-forming material. With too little oleic acid the blowing reaction is not as good, and with too much oleic acid the curing of the sponge is inhibited. This dispersing agent can conveniently be incorporated with the organic material prior to intermixture of the aqueous nitrite solution.

The following examples illustrate the preparation of elastomeric polyurethane polymer sponge by means of the present invention. The liquid polyester-and-diisocyanate intermediate used in Examples I and II was derived from a polyester made by heating the following mixture at 220–230° C.:

| | Mols |
|---|---|
| Propylene glycol | 11.00 |
| Ethylene glycol | 4.25 |
| Adipic acid | 11.25 |

The use of the propylene glycol results in a polyester of lower melting point and lower viscosity. In the course of the preparation of the polyester the unreacted glycol was removed by vacuum distillation, the extent of the distillation determining the molecular weight of the polyester as calculated by the acid number and the hydroxyl number. The polyester had a molecular weight of about 1800, a hydroxyl number of about 60 and an acid number less than 1. This polyester was mixed at a temperature of 85° C. with a 100% excess of p,p'-diphenylmethane diisocyanate, the proportions by weight being 80 parts of the polyester to 20 parts of the diisocyanate. A reaction occurred between the hydroxyl groups of the polyester and the isocyanate groups to form a polyurethane intermediate characterized by the presence of unreacted isocyanate groups. This intermediate was a liquid and was soluble in the common organic solvents such as acetone, benzene and chloroform. This product is designated adduct A in Examples I and II.

EXAMPLE I

One hundred parts of adduct A, described above, were heated to 80° C., and a solution composed of 2.8 parts of water and 2.8 parts of potassium nitrite was dispersed in the heated liquid. The reaction product was heated somewhat in order to make it fluid enough so that the aqueous solution of potassium nitrite could be easily dispersed in it. After the potassium nitrite solution had been dispersed in the reaction product, the mass commenced to expand; it increased in size from a starting volume of 87 ml. to a volume of 920 ml. in about five minutes. When the expansion or blowing reaction had stopped, a yellow, sponge-like product was obtained. This material was cured for one-half hour in air at 100° C. The cured product had an even, cellular structure and an apparent density of 0.125 g./ml. A second sponge from which potassium nitrite was omitted but which was otherwise prepared exactly as the sponge just described, had a density of 0.27 g./ml. This sponge did not have the yellow color which is characteristic of sponges blown with an aqueous solution of alkali-metal nitrite.

EXAMPLE II

This example shows that water must be used in conjunction with the alkali metal nitrite in order to obtain a low-density sponge.

Three sponges were made in accordance with the following formulations:

| Ingredients | Parts (by weight) | | |
|---|---|---|---|
| | A | B | C |
| Polyester-and-diisocyanate reaction product | 100 | 100 | 100 |
| Oleic Acid | 4 | 4 | 4 |
| Potassium nitrite | 2.8 | 2.8 | |
| Water | 2.8 | | 2.8 |

The procedure followed in preparing each of these sponges was the same as that used in Example I. The oleic acid, which was mixed with the reaction product before dispersion of the aqueous potassium nitrite, served as a dispersing aid for the potassium nitrite. Each formulation had a volume of about 90 ml. before the blowing reaction started. The volume of each sponge after the blowing reaction, and the density of each sponge after cure, are given in the following table:

Table I

| Sponge | Volume | Apparent Density (g./ml.) |
|---|---|---|
| A | 720 | 0.14 |
| B | 106 | 1.0 |
| C | 365 | 0.29 |

It will be observed from the density data in Table I that the product made by using an aqueous solution of potassium nitrite was expanded to twice the degree of the product made only with water. Virtually no blowing took place in the product made with potassium nitrite alone. (The density of unblown elastomeric polyurethane polymer made from the above reaction product with water as cross-linking agent being about 1.2.)

EXAMPLE III

A polyester was prepared as described previously by reacting a mixture of ethylene and propylene glycols with adipic acid to make a polyester of molecular weight 1980 in which the end groups were predominantly hydroxyl. A prepolymer was then prepared by mixing 198 grams (0.1 mole) of this polyester with 52.2 grams (0.3 moles) of tolylene diisocyanate (80% 2,4-isomer, 20% 2,6-isomer) and heating the mixture at 50° C. for 16 hours. Foam was prepared by mixing 4 parts of 50% aqueous potassium nitrite solution in 100 parts of the prepolymer at room temperature. The mixture foamed slowly and made a low density sponge with a coarse structure.

EXAMPLE IV

A polyether made by polymerizing propylene oxide to a molecular weight of 2000 was reacted by heating for 30 minutes at 140° C. with tolylene diisocyanate (80% 2,4-isomer, 20% 2,6-isomer) in the ratio of 43 parts (0.247 mole) of the diisocyanate to 100 parts (0.05 mole) of polyether to form a prepolymer. Low density sponge was made by reacting 100 parts of the prepolymer with 12 parts of 50% aqueous potassium nitrite. The mixture was self-curing and no heating was required.

EXAMPLE V

A prepolymer was made by reacting tolylene diisocyanate (80% 2,4-isomer, 20% 2,6-isomer) with a commercially available polyfunctional hydroxyl terminated polyether (known as Tetronic 701). This polyether contained 10% ethylene oxide and 90% propylene oxide polymerized on ethylene diamine. The prepolymer was made by mixing 56 parts of tolylene diisocyanate with 148 parts of the polyether and allowing the mixture to stand overnight (16 hours) before making foam. In the prepolymer the ratio of isocyanate to hydroxyl groups was 2.8. A yellow low density sponge was obtained by mixing 100 parts of the prepolymer and 4 parts of 50% aqueous potassium nitrite solution.

In a similar manner, the invention may be practiced using any conventional polyurethane-elastomer-forming ingredients, such as any of the polyesters, polyethers, and diisocyanates of the prior art referred to previously.

The stress-strain properties of elastomeric synthetic polyurethane polymer sponge blown with the aqueous solution of alkali metal nitrite in accordance with my invention are very similar to those of natural rubber sponge made from latex in the well-known manner. For example, the load-carrying capacity at 25% compression of a sponge similar to that prepared by the process of Example I was found to be 54 grams per square centimeter. The load-carrying capacity of a natural rubber latex sponge of the same density is 52 grams per square centimeter.

From the foregoing description it will be seen that the present invention provides a simple and practical method of preparing the low density sponge elastomeric synthetic polyurethane polymers. Thus, my invention provides a very satisfactory solution to a problem which has confronted the art for some time. The invention yields a flexible, compressible sponge which has most of the properties of natural rubber sponge made by the conventional method from natural rubber latex, and which in addition possesses the unique advantages of a material made from an elastomeric synthetic polyurethane polymer.

Having thus described my invention, what I claim and desire to protect by Letters Patent is:

1. The method of making an expanded elastomeric polyurethane polymer which comprises intimately incorporating an aqueous solution of an alkali metal nitrite into a liquid adduct of an organic diisocyanate with a material having an average molecular weight of from 900 to 6000 and having alcoholic hydroxyl terminal groups in its molecules, selected from the group consisting of (1) linear polymeric polyesters of a saturated aliphatic dicarboxylic acid and a glycol and (2) linear poly alkylene polyethers, the molecular proportion of said diisocyanate to said material being from 1.2 to 1 to 5 to 1, and permitting the resulting mixture to expand and cure.

2. The method of claim 1, in which the expanded material is heated to complete the cure.

3. The method of claim 1, wherein the amount of said alkali metal nitrite is equal to from 1 to 5% of the weight of said adduct, and wherein the amount of water in which said nitrite is dissolved is equal to from 1 to 5% of the weight of said adduct.

4. A method as in claim 1, wherein the molecular proportion of said diisocyanate to said material is from 1.5 to 1 to 3 to 1, and the said material has a molecular weight of from 1500 to 3000.

5. A method as in claim 1, in which the said material is a linear polymeric polyester of a saturated aliphatic dicarboxylic acid and a glycol.

6. A method as in claim 1, in which the said material is a linear polyalkylene polyether.

7. The method of making an expanded elastomeric polyurethane polymer which comprises intimately incorporating an aqueous solution of an alkali metal nitrite with a liquid adduct of an organic diisocyanate and a linear polymeric polyester of a glycol and an aliphatic saturated dicarboxylic acid, said polyester having a hydroxyl number of from 20 to 120, an acid value less than 2, and a molecular weight of from 1700 to 3000, said glycol being in excess over said acid so that the terminal groups of the polyester are predominantly alcoholic hydroxyl, the molecular proportion of said diisocyanate to said polyester being from 1.2 to 1 to 5 to 1, permitting the resulting mixture to expand, and subsequently heating the expanded material to complete curing of the polyurethane polymer.

8. The method of claim 7, wherein the amount of said alkali metal nitrite is equal to from 1 to 5% of the weight of said adduct and wherein the amount of water in which said nitrite is dissolved is equal to from 1 to 5% of the weight of said adduct.

References Cited in the file of this patent

UNITED STATES PATENTS

| | | |
|---|---|---|
| 2,764,565 | Hoppe et al. | Sept. 25, 1956 |
| 2,797,201 | Veatch | June 25, 1957 |

FOREIGN PATENTS

| | | |
|---|---|---|
| 540,786 | Italy | Mar. 13, 1956 |